D. E. FERGUSON.
MEASURING INSTRUMENT.
APPLICATION FILED JAN. 16, 1913.
1,081,033.
Patented Dec. 9, 1913.
2 SHEETS—SHEET 1.
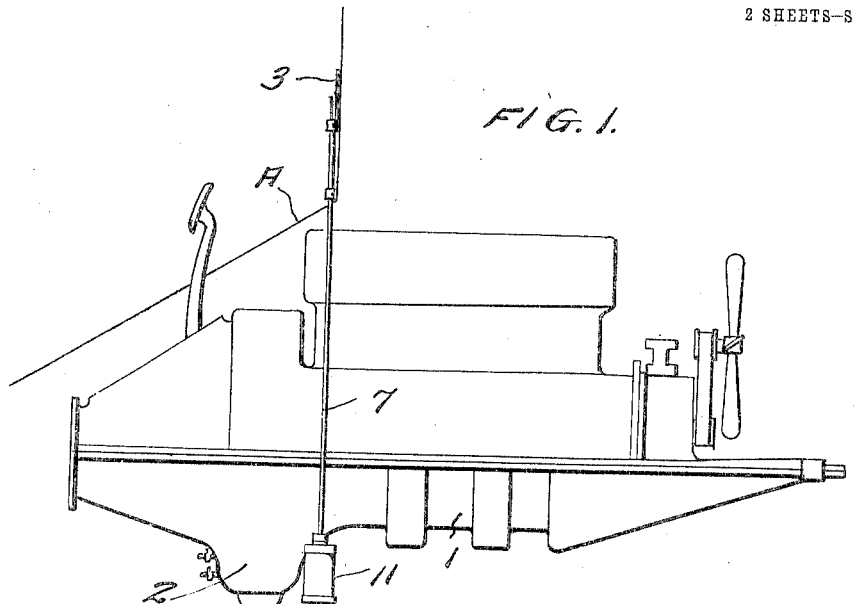
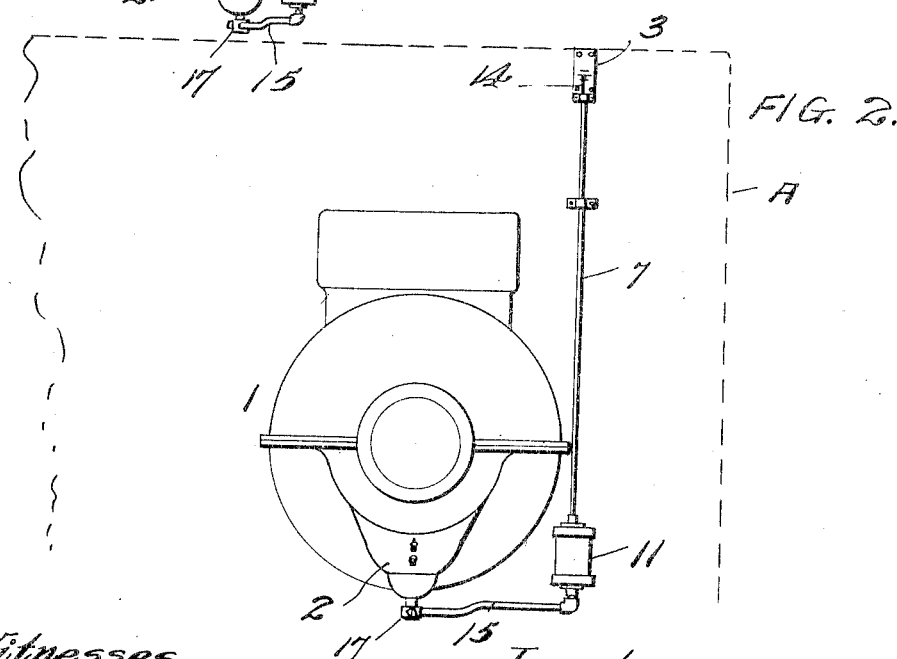
Witnesses
C. K. Davis
M. L. Newcomb
Inventor
D. Earl Ferguson
By Herman A. Phillips
Attorney

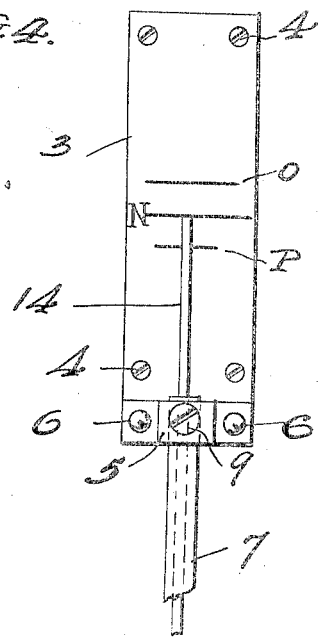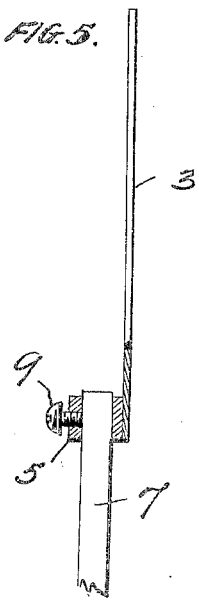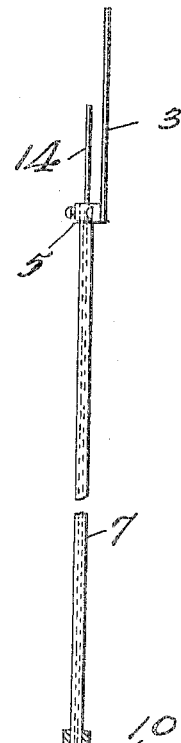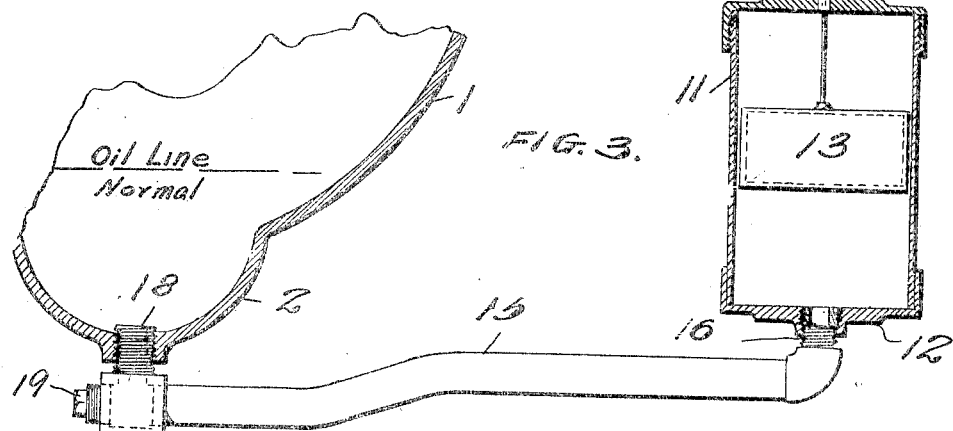

UNITED STATES PATENT OFFICE.

D. EARL FERGUSON, OF VERNON, MICHIGAN.

MEASURING INSTRUMENT.

1,081,033.　　　Specification of Letters Patent.　　Patented Dec. 9, 1913.

Application filed January 16, 1913. Serial No. 742,424.

*To all whom it may concern:*

Be it known that I, D. Earl Ferguson, a citizen of the United States, residing at Vernon, in the county of Shiawassee and State of Michigan, have invented certain new and useful Improvements in Measuring Instruments, of which the following is a specification.

My invention relates to improvements in measuring instruments and is designed particularly for the purpose of measuring and indicating the quantity of oil or other lubricant in an oil reservoir.

In the practical application of my invention I have specially adapted the device for use with automobiles to indicate to the driver of the car the quantity of oil in the oil reservoir, which as I have herein illustrated, is the fly wheel casing located under the car.

The prime object of the invention is to provide an indicator, which is conveniently located on the dash board of the automobile in full view of the driver, and is actuated, through the medium of the oil to indicate the oil level in the reservoir, and thus notify the driver continuously, of the state of oil in the reservoir.

The invention consists in certain novel features of construction and combinations and arrangements of parts as will be hereinafter pointed out.

In the accompanying drawings I have illustrated one complete example of the physical embodiment of my invention constructed according to the best mode I have so far devised for the practical application of the principles thereof.

Figure 1 is a side elevation of an engine casing for an automobile, with my appliance adapted thereto. Fig. 2 is a front view of Fig. 1 as seen from the left, the dash board of the automobile being indicated in dotted lines. Fig. 3 illustrates the device, partly in section, on an enlarged scale, and connected to the oil reservoir. Fig. 4 is a face view of the indicator plate with its markings, showing the relation of the indicator stem thereto, and an adjusting feature. Fig. 5 is a sectional detail of Fig. 4, at right angles thereto.

In the preferred embodiment of my invention I have illustrated it in connection with an automobile of the Ford type of car, in which the engine casing 1 is provided with a section or portion 2 forming an oil reservoir from which the cylinders, etc., are automatically lubricated in manner well known.

The normal oil level is indicated (Fig. 3) in the fly-wheel casing or oil reservoir 2, and by means of the intermediate connections to be described, the quantity of oil in the reservoir is indicated on the indicator plate 3. This plate 3 is located on the front dash board, indicated by the letter A, in full view of the driver, and is provided with a normal mark N, a maximum mark O, and a minimum mark P. The plate is secured to the dash board by means of screws 4, and at its lower end has secured thereto an adjustment block 5, rigidly fixed to the plate by rivets 6, 6. The perforated block 5 receives the upper end of a tube 7, and by means of the set screw 9 in the block, the indicator plate may be held rigidly in adjusted position with relation to the tube.

The lower end of the tube 7 is fixed within the top 10 of a cup 11, whose bottom 12 is fixed to the cup. The top 10 of the cup is screwed on the cup in order that the float 13 and its stem 14 may be adapted for operation with the cup. The float is designed to rest upon the surface of the oil contained in the cup 11, and the stem, which is fixed to the float, extends upwardly through the tube with its end in operative relation to the markings N, O, and P.

The oil reservoir and oil cup are connected by a pipe 15, a nipple 16 being used to connect with the cup, and the connection to the reservoir being made through a box or coupling 17 formed with a nipple 18 threaded into the reservoir, and having also a drain plug 19. By unscrewing the plug 19 the contents of the reservoir and cup may be withdrawn as will readily be understood.

In attaching the device to a car, the length of the tube and stem is adapted to the height of the car and its dash board, and the indicator plate is secured in adjusted position on the tube by means of the set screw.

What I claim is:—

The combination with the oil reservoir of an automobile, of a coupling box secured thereto and provided with a drain plug, an oil cup and a bent pipe connecting the cup and box, a float in the cup, a tube opening into the cup and extending upwardly therefrom, an indicator plate attached to the dash of the automobile and held in adjusted position on the tube, and a stem on the float extending through the tube having its end in operative relation to the indicator plate.

In testimony whereof I affix my signature in presence of two witnesses.

D. EARL FERGUSON.

Witnesses:
S. M. HUBBELL,
M. L. NEWCOMB.